(12) United States Patent
Sthanikam et al.

(10) Patent No.: US 8,090,731 B2
(45) Date of Patent: Jan. 3, 2012

(54) DOCUMENT FIDELITY WITH BINARY XML STORAGE

(75) Inventors: Balasubramanyam Sthanikam, Foster City, CA (US); Sivasankaran Chandrasekar, Menlo Park, CA (US); Nipun Agarwal, Santa Clara, CA (US); Sam Idicula, Santa Clara, CA (US); Vijay Medi, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 422 days.

(21) Appl. No.: 12/180,760

(22) Filed: Jul. 28, 2008

(65) Prior Publication Data

US 2009/0112902 A1 Apr. 30, 2009

Related U.S. Application Data

(60) Provisional application No. 60/983,543, filed on Oct. 29, 2007.

(51) Int. Cl.
*G06F 17/30* (2006.01)

(52) U.S. Cl. .......................... 707/756; 707/802; 715/234

(58) Field of Classification Search ........................ None
See application file for complete search history.

(56) References Cited

U.S. PATENT DOCUMENTS

| | | | |
|---|---|---|---|
| 5,780,830 A | 7/1998 | Boie et al. | |
| 5,991,713 A | 11/1999 | Unger et al. | |
| 6,966,029 B1 | 11/2005 | Ahern | |
| 7,165,239 B2 | 1/2007 | Hejlsberg et al. | |
| 7,318,194 B2 | 1/2008 | Achilles et al. | |
| 7,340,611 B2 | 3/2008 | Alev et al. | |
| 7,398,265 B2 | 7/2008 | Thusoo et al. | |
| 7,441,185 B2 | 10/2008 | Coulson et al. | |
| 7,496,512 B2 | 2/2009 | Zhao et al. | |
| 7,500,017 B2 | 3/2009 | Cseri et al. | |
| 2003/0041302 A1 | 2/2003 | McDonald | |
| 2003/0046317 A1* | 3/2003 | Cseri et al. | 707/513 |
| 2004/0122851 A1* | 6/2004 | Kinno et al. | 707/102 |
| 2005/0060647 A1 | 3/2005 | Doan et al. | |
| 2005/0278289 A1 | 12/2005 | Gauweiler et al. | |
| 2005/0278616 A1 | 12/2005 | Eller | |
| 2006/0085737 A1 | 4/2006 | Liu | |

(Continued)

OTHER PUBLICATIONS

Sivasankaran Chandrasekar et al., "Oracle Binary XML Format", Draft RFC Mar. 21, 2007, pp. 1-40.*

(Continued)

*Primary Examiner* — Cheryl Lewis
*Assistant Examiner* — Scott A Waldron
(74) *Attorney, Agent, or Firm* — Hickman Palermo Truong & Becker LLP; Marcel K. Bingham; Daniel D. Ledesma

(57) ABSTRACT

Techniques are provided for ensuring lexical fidelity when an XML document is stored in a binary format. Operations, on the XML data, that would cause the loss of lexical fidelity between the original XML document and the binary-encoded version of the XML document are not performed. Such operations include the removal of unnecessary whitespace characters, certain data type conversions, CRLF normalization, the "collapsing" of two-tag empty elements into a single tag empty element, and the replacing of entity references or numeric character references with another value. An XML schema, to which the XML document conforms, may indicate that the XML document is to be stored in a lexical fidelity mode. Additionally, or alternatively, the database statement that (when executed) causes the XML document to be stored in a binary format may so indicate.

26 Claims, 3 Drawing Sheets

U.S. PATENT DOCUMENTS

| | | | |
|---|---|---|---|
| 2006/0168513 | A1 | 7/2006 | Coulson et al. |
| 2006/0212467 | A1 | 9/2006 | Murthy et al. |
| 2006/0235868 | A1 | 10/2006 | Achilles et al. |
| 2007/0006078 | A1 | 1/2007 | Jewsbury et al. |
| 2008/0028296 | A1 | 1/2008 | Aharoni |
| 2008/0098019 | A1 | 4/2008 | Sthanikam et al. |
| 2009/0055395 | A1* | 2/2009 | Jenks et al. .................. 707/6 |

OTHER PUBLICATIONS

Ravi Murthy & Sandeepan Banerjee, "XML Schemas in Oracle XML DB", Proceedings of the 29th VLDB Conference, Berlin, Germany, 2003, pp. 1-10.*

"Notification of Transmittal of the International Search Report and the Written Opinion of the International Searching Authority, or the Declaration" received from International application No. PCT/US2008/071492 mailed Nov. 26, 2008 (15 pages).

"Efficient XML Interchange Measurements" XP-002503310, Working Draft Jul. 25, 2007 (142 pages).

Giradot, M. et al., "Millau: an encoding format for efficient representation and exchange of XML over the Web" XP-001005949, 2000 (20 pages).

"XML Parsing" XP-002503367 Oct. 11, 2008 (4 pages).

* cited by examiner

DOCUMENT FIDELITY WITH BINARY XML STORAGE

PRIORITY CLAIM

This application claims priority to U.S. Provisional Application 60/983,543, filed Oct. 29, 2007, entitled DOCUMENT FIDELITY FOR BINARY XML, the contents of which are incorporated by reference as if fully set forth herein. This application is related to U.S. Non-Provisional application Ser. No. 11/743,563, filed on May 2, 2007, now U.S. Pat. No. 8,010,889, issued on Aug. 30, 2011.

FIELD OF THE INVENTION

The present invention relates generally to processing XML data and, more specifically, to techniques for ensuring document fidelity when XML data is stored in a binary format.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

XML

Database systems often store XML-formatted data within their databases. This data may come from a variety of sources, though the source is often an XML document or a database object.

In XML, data items known as elements are delimited by an opening tag and a closing tag. An element may also comprise attributes, which are specified in the opening tag of the element. Text between the tags of an element may represent any sort of data value, such as a string, date, or integer.

Text within an element may alternatively represent one or more elements. Elements represented within the text of another element are known as subelements or child elements. Elements that store subelements are known as parent elements. Since subelements are themselves elements, subelements may, in turn, be parent elements of their own subelements. Parent elements and elements with attributes are considered "complex elements" whereas elements that have neither children elements nor attributes are considered "simple elements." Attributes, like elements, are considered nodes. Attributes are also considered to be "simple" because they never have child elements or attributes.

The resulting hierarchical structure of XML-formatted data is often discussed in terms akin to those used to discuss a family tree. For example, a subelement is said to descend from its parent element or any element from which its parent descended. A parent element is said to be an ancestor element of any subelement of itself or of one of its descendant elements. Collectively, an element along with its attributes and descendants, are often referred to as a tree or a subtree.

XML Schema

XML Schema is a definition language that provides facilities for describing structure and constraining the contents of an XML document. A draft specification, referred to hereinafter as "XML Schema Specification", for the XML Schema definition language is described in a set of three documents published by the W3C Consortium. The first document in the set is "XML Schema Part 0: Primer Second Edition", W3C Recommendation 28 Oct. 2004, located at "http://www.w3.org/TR/xmlschema-0/", the entire contents of which are hereby incorporated by reference for all purposes as if fully set forth herein. The second document in the set is "XML Schema Part 1: Structures Second Edition", W3C Recommendation 28 Oct. 2004, located at "http://www.w3.org/TR/xmlschema-1/", the entire contents of which are hereby incorporated by reference for all purposes as if fully set forth herein. The third document in the set is "XML Schema Part 2: Datatypes Second Edition", W3C Recommendation 28 Oct. 2004, located at "http://www.w3.org/TR/xmlschema-2/", the entire contents of which are hereby incorporated by reference for all purposes as if fully set forth herein.

As referred to herein, an XML schema is a defined structure for one or more XML documents. An XML schema representation is data that describes the XML structure. An XML schema representation may include an XML document with declarations and/or a tokenized XML representation which is one for which tokens have been generated. An example of an XML schema representation includes, but is not limited to, an XML document with type definitions, element declarations, or attribute declarations.

Binary-Encoded XML

Binary-encoded XML is one format in which XML data may be stored in a database. Binary-encoded XML is taught, for example, in U.S. Pat. No. 8,010,889, incorporated above. Binary-encoded XML is a compact binary representation of XML that was designed to reduce the size of XML documents. One of the ways binary-encoded XML compressed data is by representing strings ("tokens") with fixed values.

In one implementation of binary-encoded XML, a mapping is established between character strings and replacement values, where the character strings are tag names, and the replacement values are numbers. Such mappings are referred to herein as "translation information".

For example, consider an XML document PO1 that contains the following content:

```
<PurchaseOrder>
    <item>
        Important Data
    </item>
</PurchaseOrder>
```

PO1 includes the tokens 'PurchaseOrder' and 'item'. To store PO1 in binary-encoded XML format, the token 'PurchaseOrder' may be mapped to 1, and the token 'item' may be mapped to 2. Typically, the replacement values consume much less space than the corresponding tokens. For example, the token 'PurchaseOrder', which contains fourteen characters, may be assigned a binary replacement value that takes less space to store than a single text character.

Once translation information has been created, XML documents may be stored in binary-encoded XML based on the translation information. For example, PO1 may be stored as <1><2>Important Data</2></1>. In typical implementations of binary-encoded XML, even the symbols (e.g. "<", ">", and "/") may be represented by binary replacement values. A process of storing XML documents in binary-encoded XML based on translation information associated with tag names in the XML documents is referred to herein as a "token-based binary encoding technique." A token-based binary encoding technique is one of many possible binary encoding techniques to encode XML data in a binary format.

Translating Between Binary-Encoded XML and Text

When stored in binary-encoded XML, an XML document consumes much less space than is required by other formats of XML storage. However, the space savings is achieved at the cost of additional overhead required to convert textual XML to binary-encoded XML, and to convert binary-encoded XML to textual XML. For example, to be meaningful to an application that requests PO1, '<1><2>Important Data</2></1>' would have to be translated back into:

```
<PurchaseOrder>
    <item>
        Important Data
    </item>
</PurchaseOrder>
```

In order to reconstruct the text of an XML document that has been stored in a binary format, the translation information that was used to encode the XML document must be available. The translation information that is used to store XML data within a database are typically stored separate from the binary-encoded XML data itself.

Translation Information

How a database system stores translation information may hinge on whether the translation information is for known-schema XML or for unknown-schema XML. XML data is "known-schema" XML if the database server knows the XML schema to which the XML data conforms. The database server may "know" the schema, for example, if the schema has been registered with the database server.

On the other hand, XML data is "unknown-schema" XML if the database server does not know the schema to which the XML data conforms. Thus, unknown-schema XML includes both (a) XML documents that do not conform to any schema and (b) XML documents that conform to an XML schema, but the XML schema is not known to the database server.

In some database systems, the translation information for known-schema binary-encoded XML is stored on a per-schema basis. Thus, since all documents that conform to a given schema will typically contain the same tag strings, the same translation information is used to encode all of the documents that conform to the given schema.

In some database systems, the translation information for known-schema binary-encoded XML is stored in a database as part of the definition of the schema. Schema definitions, in turn, are stored in a schema table.

In some database systems, translation information may not be required for known-schema binary-encoded XML. In such database systems, the algorithm for translating between binary-encoded XML and non-binary-encoded XML is well known, so that any component with access to an XML schema may determine a translation based solely on the XML schema.

For example, the following XML schema, hereinafter known as POSchema1 may have been used to encode PO1 above:

```
<?xml version="1.0" encoding="utf-8"?>
<xs:schema xmlns:xs="http://www.w3.org/2001/XMLSchema">
    <xs:element name="PurchaseOrder">
        <xs:complexType>
            <xs:sequence>
                <xs:element name="item" type="xs:int"
                    maxOccurs="2" />
            </xs:sequence>
        </xs:complexType>
    </xs:element>
</xs:schema>
```

Because 'PurchaseOrder' is the first element listed in the schema, it may have been encoded as the number 1. Likewise, since 'item' is the second element in the schema, it may have been encoded as the number 2. Other elements may be encoded using this same algorithm. An XML decoder may decode any document that follows this schema just by examining POSchema1 and being aware of this encoding algorithm.

In some database systems, the translation information for all unknown-schema binary-encoded XML is stored in tables referred to herein as "token tables". In one embodiment, three token tables are used to store the translation information for unknown-schema XML: a Qname token table, a namespace token table, and a path_id token table. The three token tables are collectively referred to as a "token table set".

The Qname token table for an XML schema contains the Qname-to-replacement-value mappings used to encode the Qnames contained in unknown-schema XML. The namespace token table for an XML schema contains the namespace-to-replacement-value mappings used to encode the namespaces contained in unknown-schema XML. The path_id token table for an XML schema contains the path_id-to-replacement-value mappings used to encode the path_ids contained in unknown-schema XML.

Operations on XML Data During the Binary Storage Process

In one approach to encode XML data, certain operations are performed on the XML data during the process of storing the XML data in a binary format. The binary storage process comprises parsing the XML data to generate XML events and encoding the XML events into a binary format. One example operation is the removal of certain whitespace characters. According to the XML specification, whitespace characters within element tags may be ignored. Therefore, when an element "<a>" is encoded into a binary format, that element is represented as "<a>" in the binary format. Another example operation is the conversion from a text number to an IEEE 754 floating point number. If the XML schema of an XML document indicates that a "4.0" in a certain node is a number, then the IEEE 754 standard is applied to that number. In binary, "4.0" is represented as 3.99999!.

In both examples, although the XML level semantics of non-binary XML data are the same as the corresponding binary XML data, the non-binary XML data and binary XML data are not lexically equivalent. In other words, under this approach, lexical fidelity is lost during the binary storage process. Operations that are performed on XML data during the binary storage process that cause lexical fidelity to be lost are referred to herein as "lexically-lossy operations", or LLOs.

In some contexts, lexical "infidelity" is not a problem. However, in other contexts, LLOs cannot be performed without negative consequences. One such context is the use of document-centric applications. For example, some publications (e.g., books) are represented as XML documents. The document-centric nature of such XML documents requires that the retrieval of XML data from storage must be lexically equivalent to the XML data as it existed before storage.

Another context in which LLOs should not be performed is the use of digital signatures. Some users desire a digital signature to be applied to an XML document before the XML document is stored in persistent storage ("pre-storage document") and after the XML document is retrieved from persistent storage ("post-storage document"). If even one whitespace character is not found in the post-storage document, then the digital signatures of the pre-storage document will not be the same as the digital signature of the post-storage document. If the digital signatures of the respective documents are not the same, then the post-storage document is not guaranteed to be the same as the pre-storage document. Consequently, the post-storage document cannot be used. As a result, such users must store the XML document as a character large object (CLOB) to ensure lexical equivalence. However, CLOB storage of XML data generally requires more storage capacity and is slower in terms of query processing and update processing than binary storage of the same XML data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As stated previously, users of document-centric applications and users who wish to apply a digital signature on XML documents previously used CLOB storage for XML documents to ensure complete lexical fidelity, i.e., no information is lost during the storage or retrieval process. However, querying and updating XML data in CLOB storage is relatively slower than querying and updating XML data in binary storage. Thus, techniques are provided to leverage the benefits of binary storage while retaining complete lexical fidelity.

In order to retain lexical fidelity of an XML document that is to be stored in a binary format, an XML parser and/or encoder should not perform any LLO on the XML document. In other words, operations that would cause the loss of lexical fidelity between the pre-storage document and the post-storage document should not be performed. Non-limiting examples of LLOs include (a) ignoring unnecessary whitespace characters (and thus not accounting for the unnecessary whitespace characters in binary storage), (b) certain data type conversions, (c) CRLF normalization, (d) collapsing empty elements, and (e) replacing entity references, numeric character references, and user-defined entities.

Techniques are also provided for querying and updating binary-encoded XML data that is lexically equivalent to the original XML data.

Functional Overview

Figure 1:
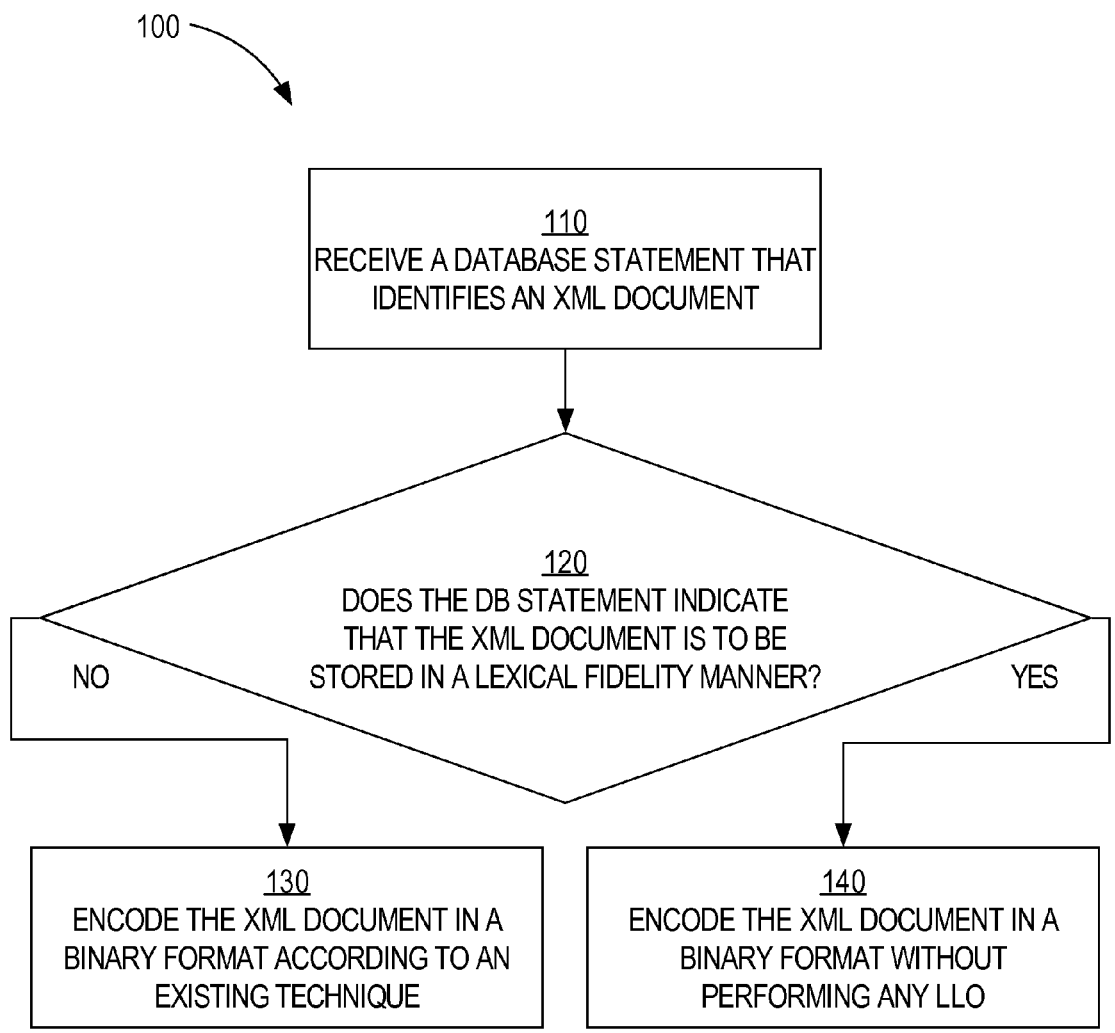
FIG. 1 is a flow diagram that depicts a brief overview of storing an XML document in a lexically-equivalent manner, according to an embodiment of the invention.

FIG. 1 is a flow diagram 100 that depicts an overview of storing an XML document in a lexically-equivalent manner, according to an embodiment of the invention. At step 110, a database statement that identifies an XML document is received. At step 120, it is determined whether the database statement indicates that the XML document is to be stored in a lexically-equivalent manner. In other words, it is determined whether the stored version of the XML document is required to be lexically equivalent to the pre-stored version of the XML document.

If the database statement does not so indicate, then, at step 130, the XML document is encoded in a binary format, according to a first token-based binary encoding technique that may include LLOs to generate a binary version of the XML document.

If the database statement indicates that the XML document is to be stored in a lexically-equivalent manner, then, at step 140 the XML document is encoded in a binary format, according to a second token-based binary encoding technique, to generate a binary version of the XML document. However, the second technique does not involve performing any LLOs on the XML document.

Specifying Lexical Fidelity

An XML document may be stored according to one of at least two modes: a lexical fidelity mode or a non-lexical fidelity mode. An XML document is stored in a lexical fidelity mode if the lexical fidelity of the XML document is ensured. In an embodiment, a lexical fidelity mode for an XML document may be specified in a data definition language (DDL) statement that identifies the table which will contain the XML document, e.g., at the time of table creation. Each subsequent XML document may be inserted as a new row in the XML-Type table. Additionally or alternatively, lexical fidelity of an XML document may be specified in an XML schema to which the XML document conforms. Such a schema is referred to herein as an "XML document's schema."

In an embodiment, only one of a DDL statement or an XML document's schema must specify lexical fidelity in order for a lexical fidelity mode to be "turned on." Alternatively, both a DDL statement and an XML document's schema must specify lexical fidelity in order for a lexical fidelity mode to be "turned on." In a related embodiment, if an XML document's schema is unknown, then the DDL statement must specify lexical fidelity.

Conversion Process

Figure 2:
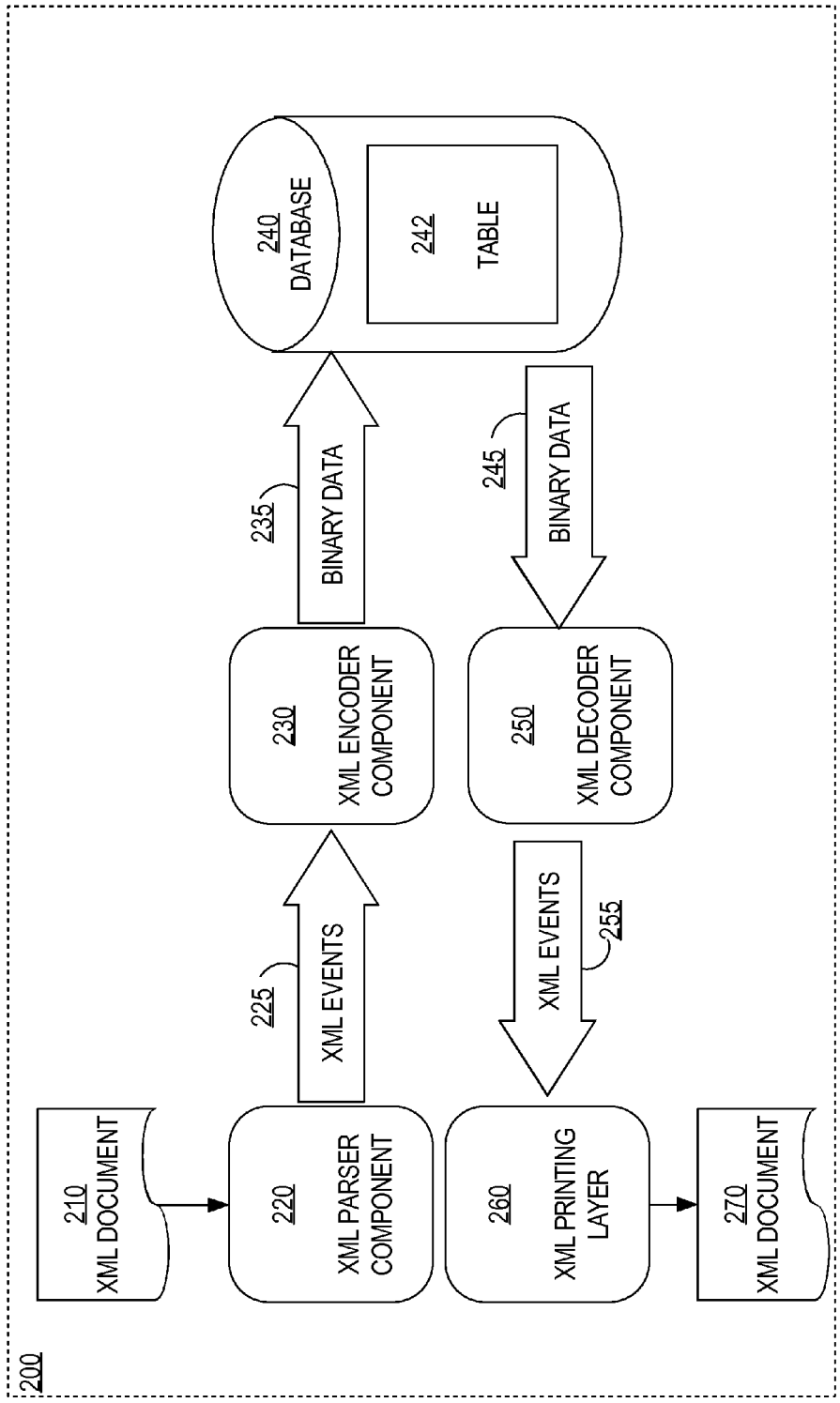
FIG. 2 is a block diagram that depicts a database system that converts an XML document into binary data and back to an XML document, according to an embodiment of the invention.

FIG. 2 is a block diagram that depicts a database system 200 that converts an XML document 210 into binary data 235 and back to an XML document 270, according to an embodiment of the invention. Database system 200 comprises an XML parser component 220, an XML encoder component 230, a database 240, an XML decoder component 250, and an XML printing layer 260.

XML document 210 is input to XML parser component 220. XML parser component generates XML events 225 based on XML document 210. XML events 225 are input to XML encoder component 230. XML encoder component 230 generates binary data 235 based on XML events 225. Binary data 235 is then stored in a table 242 of database 240.

When requested from database 240, binary data 245 may be decoded by XML decoder component 250 to generate XML events 255. If a user so desires, XML events 255 may be processed by XML printing layer 260 to generate XML document 270.

If XML document 210 is stored in a lexically-equivalent manner, then XML document 270 will be lexically-equivalent to XML document 210. Also, if XML document 210 is stored in a lexically-equivalent manner, then binary data 235 and 245 are said to be lexically-equivalent to XML document 210 even though binary data 235 and 245 are in a different form than XML document 210.

Embodiments of the invention are not limited to any particular type of parser to generate XML events 225. For example, XML parser component 220 may be a STAX parser, a SAX parser, a DOM parser, or any variation and/or combination thereof.

In an embodiment, XML parser component 220 is modified to account for lexical fidelity. Specifically, XML parser component 220 is modified to not perform LLOs on XML document 210, such as data type conversions from a text number to a IEEE 754 floating point number.

In a related embodiment, XML encoder component 230 is modified in a similar manner as XML parser component 220. If XML encoder component 230 is originally configured to perform one or more LLOs on XML events 225, then XML encoder component 230 is modified to not perform those one or more LLOs.

XML decoder component 250 may be originally configured to perform one or more LLOs on binary data 245. For example, binary data 245 may include data that represents unnecessary whitespace characters. XML decoder component 250 may be configured to ignore the unnecessary whitespace characters when decoding binary data 245 into XML events 255. Therefore, in another related embodiment, XML decoder component is modified in a similar manner as XML parser component 220 and XML encoder component 230 to not perform any LLO on binary data 245.

Whitespace Preservation

One type of LLO mentioned previously is the removal of unnecessary whitespace characters (referred to herein as "unnecessary whitespace"). According to the standard XML specification approved by W3C (referred to herein as "the XML specification"), certain whitespace in an XML document is considered "necessary" and other whitespace is considered "unnecessary." Typically, when textual XML data is stored in a binary format, unnecessary whitespace may or may not be preserved, whereas necessary whitespace must be preserved. However, according to an embodiment of the invention, unnecessary whitespace in an XML document is always preserved.

Whitespace among text in a text node is one form of necessary whitespace. The following is an example:

<a> text here </a>

The single whitespace character between "<a>" and "text", the two whitespace characters between "text" and "here", and the three whitespace characters between "here" and "</a>" are all considered necessary whitespace.

Whitespace within an element tag is one form of unnecessary whitespace. The following is an example:

<a attribute1='g' >text</a>

The two whitespaces between "<a" and "attribute1", the single whitespace between "=" and "'g'", the single space between "'g'" and ">", and the single whitespace between "</" and "a>" are all considered unnecessary whitespace and, thus, are typically not preserved in binary storage.

Whitespace between two start element tags that have no other characters is another type of unnecessary whitespace. The following is an example:

<a> <b/> <c/> </a>

The whitespace between "<a>" and "<b/>" and the whitespace between "<b/>" and "<c/>" are all considered unnecessary whitespace and, thus, are typically not preserved in binary storage. However, if the XML document's schema or DTD specifies that element 'a' is of type mixed, then that whitespace is considered necessary whitespace, according to XML and XML Schema specifications.

In order to preserve any unnecessary whitespace in an XML document, that unnecessary whitespace is encoded into the binary version of that XML document. Subsequently, when that binary-encoded XML document is retrieved from storage, the unnecessary whitespace is accounted for and the retrieved document is lexically equivalent to the XML document as it existed before it was encoded into a binary format.

Data Type Conversion

Another type of LLO is any data type conversion that causes loss in lexical fidelity. One example of a "lossy" data type conversion is converting a number in textual XML data into an IEEE 754 floating point number, which conversion may be performed by an XML encoder. In some cases, even though the binary-encoded floating point number is technically equivalent to the original number, the binary-encoded floating point number is not lexically equivalent to the original number. Therefore, according to an embodiment of the invention, "lossy" data type conversions are not performed. Instead, for example, a number in textual XML data is stored as a binary-encoded number of type string. For subsequent query and DML processing, the binary-encoded number may have to be converted from type string to type number.

CRLF Normalization

Another type of LLO is CRLF normalization. The acronym CRLF stands for "carriage return line feed." In Windows-based text editors, such as Microsoft Word, a new line is indicated with the CR character and the LF character. In other editors, such as Unix-based editors, a new line is indicated with only an LF character. According to the XML specification, the CR character is not necessary and may be ignored. Therefore, typical XML encoders do not encode CR characters when they are encountered in an XML document. However, according to an embodiment of the invention, the CR character and any other heretofore ignored new line characters in an XML document are preserved, and therefore binary-encoded when the XML document is converted from a non-binary format to a binary format.

Empty Elements

Another type of LLO is the processing of certain empty elements. According to the XML specification, an empty element is an element without any child nodes. An empty element may be expressed in more than one way. For example, an empty element whose name is 'a' may be expressed as "<a></a>" or as "<a/>". Typically, XML parsers convert the former ("two-tag") empty element into the latter ("single tag") empty element. However, in order to ensure lexical fidelity, such a LLO is not performed, thus preserving the two-tag empty element form in binary storage. In contrast, the element "<a> </a>" is not considered an empty element; rather such an element is treated like any other text node.

Entity and Numeric Character References

Another type of LLO is related to entity references and numeric character references. An entity in XML is a named body of data, usually text. Entities are often used to represent single characters that cannot easily be entered on the keyboard. Entities are also used to represent pieces of standard (or boilerplate) text that occur in many documents, especially if there is a need to allow such text to be changed in one place only.

An entity reference is a placeholder that represents that entity. An entity reference consists of the entity's name preceded by an ampersand ("&") and followed by a semicolon (";"). XML has five predeclared entities:

| &  | &  | ampersand      |
| <   | <  | less than      |
| >   | >  | greater than   |
| ' | '  | apostrophe     |
| " | "  | quotation mark |

A user-defined entity is similar to a predeclared entity except that a user-defined entity is declared in an XML document's DTD or XML schema. The following is an example of a user-defined entity and a portion of an XML document that references that user-defined entity:

```
<!ENTITY company "Oracle USA">
<root>
    ...
    &company;
</root>
```

In this example, the entity name is "company", the entity value is "Oracle USA" and the entity reference in the portion of the XML document is "&company;".

Special characters may be represented either using entity references, or by means of numeric character references (NCRs). Numeric character references (NCRs) look like entity references. However, instead of a name, NCRs contain the "#" character followed by a number. The number (in decimal or in a "x"-prefixed hexadecimal) represents a Unicode code point. An example of an NCR is "€", which refers to the Euro symbol by means of its Unicode code point in hexadecimal.

Unlike some entity references, NCRs are not predeclared. Also, NCRs are not required to be declared in a document's DTD or schema. NCRs have typically been used to represent characters that are not easily encodable, such as an Arabic character in a document produced on a European computer.

Typically, XML parsers and/or XML encoders modify entities and NCRs in XML documents. One type of modification that XML parsers typically perform is replacing a user-defined entity reference (in an XML document) with its corresponding entity value. For example, given the "&company;" user-defined entity reference above, XML parsers typically replace each such reference with the value "Oracle USA." That value will then be encoded in a binary format. Another type of entity modification that XML parsers typically perform is replacing a predeclared entity reference with its corresponding character. For example, the predeclared entity reference "'" will be replaced with an apostrophe ('). After each of these modifications, the binary version of an XML document will not be lexically equivalent to the original XML document.

Therefore, according to an embodiment of the invention, entity references and NCRs are preserved during the parsing and encoding process. Specifically, neither XML parser component 220 nor XML encoder component 230 removes or replaces entity references or NCRs in XML document 210 with any other character. Thus, binary data 235 includes data that corresponds directly to any entity or numeric character references found in XML document 210.

Queries and Update Operations

After binary data 235 is stored in database 240, binary data 245 may be accessed in at least two ways: via a query and via an update operation (e.g., via a DML statement). A query on binary data 245 requires XML decoder component 250 to generate XML events 255. An update operation on binary data 245 may not require XML decoder component 250. Instead, an update operation may operate directly on binary data 245.

When modifying XML parser component 220 and/or XML encoder component 230 to account for lexical fidelity, some issues may arise in the context of queries and update operations of binary data 245. For example, an XML document's XML schema or DTD may indicate that a particular element in the XML document is of mixed type. An example of such an element is an element that has a child text node and a child element node. If the XML document is stored according to a lexical fidelity mode, then any new line characters in the particular element as it existed in the original XML document are treated as child nodes of the particular element. The following is an example of a portion of an XML document:

```
<a>
    <b>text</b>
    <c/>
</a>
```

If the XML document's schema or DTD indicates that element 'a' is of mixed type, then the newline characters between "<a>" and "<b>", between "</b>" "<c/>", and between "<c/>" and "</a>" should be treated as text child nodes of element 'a'. Therefore, if a query asks for the third child of element 'a', then a text node corresponding to a newline character should be returned. This is a requirement from XML and XML Schema irrespective of whether document fidelity is maintained. When document fidelity is preserved and when an XML document's schema and/or DTD do not specify 'a' to be of type mixed, the binary encoding contains the unnecessary spaces. However, the unnecessary whitespace does not count for XPath query or update, e.g., 'c' is the second child of 'a'.

In an embodiment, in response to a database statement (whether a query or an update), a SQL engine determines whether the XML document (specified in the database statement) is stored according to a lexical fidelity mode. This determination may be made by, e.g., examining the table definition of the table that stores the XML document. The table definition will indicate whether lexical fidelity has been "turned on."

The XML binary encoder may store data in a section header of the binary-encoded document that the document preserves lexical fidelity. The section header, which is stored in association with the binary-encoded document, may store various aspects of the binary encoding. A XML binary decoder and/or a SQL engine may use this information in the section header.

Hardware Overview

Figure 3:
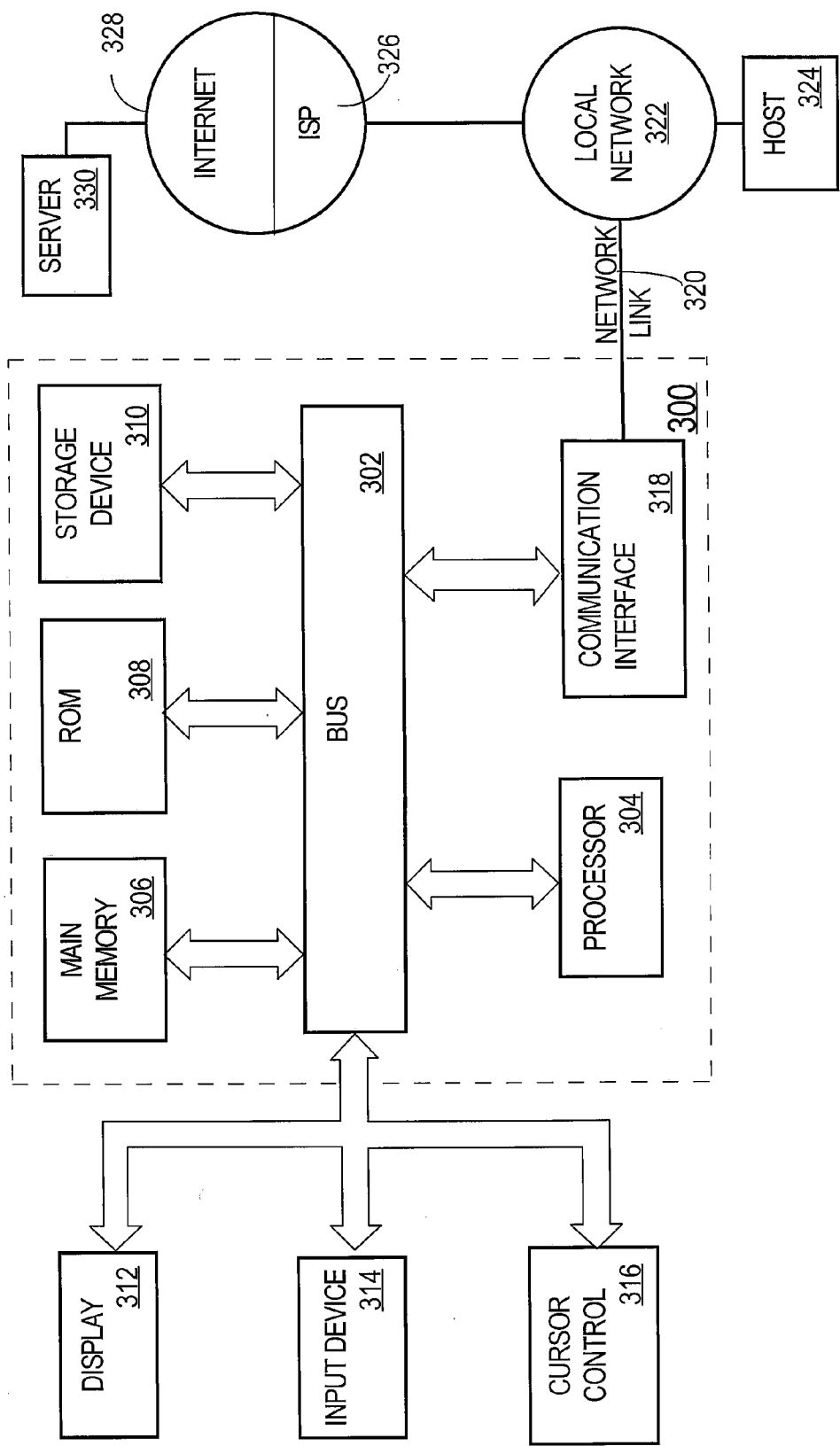
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving Extensible Markup Language (XML) data that is not encoded in a binary format;
in response to receiving the XML data, using a binary encoding technique to encode the XML data in a binary format to create a binary version of the XML data that is lexically equivalent to the XML data, wherein each character in the XML data is represented in the binary version;
wherein using a binary encoding technique comprises performing at least one of:
encoding one or more unnecessary whitespace characters that are in a particular element tag in the XML data,
encoding a carriage return character and a line feed character that appear consecutively in the XML data, or
encoding an empty XML element that comprises an opening tag and a closing tag by encoding the opening tag and the closing tag in the binary format;
storing the binary version of the XML data in persistent storage;
wherein the method is performed by one or more computing devices.

2. The method of claim 1, further comprising:
receiving a request that requires at least a portion of the binary version of the XML data; and
in response to the request, retrieving the portion from the persistent storage, wherein the portion is lexically equivalent to the corresponding portion of the XML data.

3. The method of claim 1, further comprising, before the XML data is encoded in the binary format, receiving a lexical indication that indicates that the binary version of the XML data must be lexically equivalent to the XML data.

4. The method of claim 3, wherein the lexical indication is included in one or more of (1) a data definition language (DDL) statement that, when executed, causes the XML data to be encoded in the binary format or (2) an XML schema to which the XML data conforms.

5. The method of claim 1, wherein:
the XML data includes one or more unnecessary whitespace characters; and
the binary-version of the XML data includes the one or more unnecessary whitespace characters.

6. The method of claim 1, wherein using the binary encoding technique comprises:
encoding a carriage return character and a line feed character that appear consecutively in the XML data.

7. The method of claim 1, wherein using the binary encoding technique comprises:
encoding the content of an element that is included in the XML data and that includes a number data type in the binary format as a string data type.

8. The method of claim 1, wherein using the binary encoding technique comprises:
encoding an empty XML element that is included in the XML data and that comprises an opening tag and a closing tag by opening tag and the closing tag in the binary format.

9. The method of claim 1, wherein using the binary encoding technique comprises:
encoding a reference that is included in the XML data and that is one of an entity reference or a numeric character reference in the binary format without replacing the reference with another value.

10. The method of claim 9, wherein:
the reference is a user-defined entity reference that corresponds to an entity value, and
using the binary encoding technique comprises encoding the user-defined entity in the binary format without replacing the user-defined entity reference with the entity value.

11. The method of claim 1, wherein using the binary encoding technique comprises:
encoding one or more unnecessary whitespace characters that are in a particular element tag in the XML data.

12. The method of claim 1, further comprising:
retrieving the binary version of the XML data from persistent storage; and
decoding the binary version of the XML data to create a non-binary version of the XML data, wherein the non-binary version of the XML data is the same as the XML data that was received.

13. A method comprising:
determining whether a lexical fidelity mode for binary storage has been selected for an XML document that is to be stored in a binary format, wherein if the lexical fidelity mode has been selected for a particular XML document, then each character in the particular XML document must be represented in a binary-encoded representation of the particular XML document;
if the lexical fidelity mode has been selected for the XML document, then using a first binary encoding technique to generate an encoded representation of the XML document, that represents all characters in the XML document; and
if the lexical fidelity mode has not been selected for the XML document, then using a second binary encoding technique to generate an encoded representation of the XML document, that does not represent all characters in the XML document, wherein the second binary encoding technique is different than the first binary encoding technique;

wherein the method is performed by one or more computing devices.

14. One or more storage media storing instructions which, when executed by one or more processors, causes:

receiving Extensible Markup Language (XML) data that is not encoded in a binary format;

in response to receiving the XML data, using a binary encoding technique to encode the XML data in a binary format to create a binary version of the XML data that is lexically equivalent to the XML data, wherein each character in the XML data is represented in the binary version;

wherein using a binary encoding technique comprises performing at least one of:

encoding one or more unnecessary whitespace characters that are in a particular element tag in the XML data, encoding a carriage return character and a line feed character that appear consecutively in the XML data, or encoding an empty XML element that comprises an opening tag and a closing tag by encoding the opening tag and the closing tag in the binary format;

storing the binary version of the XML data in persistent storage.

15. The one or more storage media of claim 14, wherein the instructions, when executed by the one or more processors, further cause:

receiving a request that requires at least a portion of the binary version of the XML data; and in response to the request, retrieving the portion from the persistent storage, wherein the portion is lexically equivalent to the corresponding portion of the XML data.

16. The one or more storage media of claim 14, further comprising, before the XML data is encoded in the binary format, receiving a lexical indication that indicates that the binary version of the XML data must be lexically equivalent to the XML data.

17. The one or more storage media of claim 16, wherein the lexical indication is included in one or more of (1) a data definition language (DDL) statement that, when executed, causes the XML data to be encoded in the binary format or (2) an XML schema to which the XML data conforms.

18. The one or more storage media of claim 14, wherein:

the XML data includes one or more unnecessary whitespace characters; and the binary-version of the XML data includes the one or more unnecessary whitespace characters.

19. The one or more storage media of claim 14, wherein using the binary encoding technique comprises:

encoding a carriage return character and a line feed character that appear consecutively in the XML data.

20. The one or more storage media of claim 14, wherein using the binary encoding technique comprises:

encoding the content of an element that is included in the XML data and that includes a number data type in the binary format as a string data type.

21. The one or more storage media of claim 14, wherein using the binary encoding technique comprises:

encoding an empty XML element that is included in the XML data and that comprises an opening tag and a closing tag by encoding the opening tag and the closing tag in the binary format.

22. The one or more storage media of claim 14, wherein using the binary encoding technique comprises:

encoding a reference that is included in the XML data and that is one of an entity reference or a numeric character reference in the binary format without replacing the reference with another value.

23. The one or more storage media of claim 22, wherein:

the reference is a user-defined entity reference that corresponds to an entity value, and encoding the reference in the binary format comprises encoding the user-defined entity in the binary format without replacing the user-defined entity reference with the entity value.

24. The one or more storage media of claim 14, wherein using the binary encoding technique comprises:

encoding one or more unnecessary whitespace characters that are in a particular element tag in the XML data.

25. The one or more storage media of claim 14, wherein the instructions, when executed by one or more processors, further cause:

retrieving the binary version of the XML data from persistent storage; and decoding the binary version of the XML data to create a non-binary version of the XML data, wherein the non-binary version of the XML data is the same as the XML data that was received.

26. One or more storage media storing instructions which, when executed by one or more processors, cause:

determining whether a lexical fidelity mode for binary storage has been selected for an XML document that is to be stored in a binary format, wherein if the lexical fidelity mode has been selected for a particular XML document, then each character in the particular XML document must be represented in a binary-encoded representation of the particular XML document;

if the lexical fidelity mode has been selected for the XML document, then using a first binary encoding technique to generate an encoded representation of the XML document, that represents all characters in the XML document; and if the lexical fidelity mode has not been selected for the XML document, then using a second binary encoding technique to generate an encoded representation of the XML document, that does not represent all characters in the XML document, wherein the second binary encoding technique is different than the first binary encoding technique;

wherein the method is performed by one or more computing devices.

* * * * *

UNITED STATES PATENT AND TRADEMARK OFFICE
CERTIFICATE OF CORRECTION

| | | |
|---|---|---|
| PATENT NO. | : 8,090,731 B2 | Page 1 of 1 |
| APPLICATION NO. | : 12/180760 | |
| DATED | : January 3, 2012 | |
| INVENTOR(S) | : Sthanikam et al. | |

It is certified that error appears in the above-identified patent and that said Letters Patent is hereby corrected as shown below:

In column 2, line 4, delete "xmlschema-0/"," and insert -- xmlschema-1/", --, therefor.

In column 14, line 26, in Claim 8, after "tag by" insert -- encoding the --.

Signed and Sealed this
Twenty-seventh Day of March, 2012

David J. Kappos
*Director of the United States Patent and Trademark Office*